United States Patent Office 3,719,516
Patented Mar. 6, 1973

3,719,516
TWO STAGE COATING PROCESS FOR NUCLEAR FUEL PARTICLES
Derek William James Sturge, Dorchester, and Geoffrey William Meaden, West Lulworth, England, assignors to United Kingdom Atomic Energy Authority, London, England
Filed Mar. 27, 1970, Ser. No. 23,182
Claims priority, application Great Britain, Mar. 27, 1969, 16,245/69
Int. Cl. G21c 3/06
U.S. Cl. 117—16
4 Claims

ABSTRACT OF THE DISCLOSURE

To produce a batch of fission product retaining nuclear fuel particles, with an outer overcoating of powdered graphite, such that all the product particles are within a narrow size range, the overcoating process is split into two stages through which the particles pass in succession. A grading operation follows the second stage and those product particles which are undersized are recycled to the second stage, those which are correctly sized are passed to store and those which are oversized are rendered to the uncoated condition to be recycled to the first stage. The whole process lends itself to the production of uniformly sized overcoated nuclear fuel particles which are more suited for preparing fuel elements with a uniform distribution of fission product retaining fuel in the filler material than are non-uniformly overcoated fuel particles.

BACKGROUND TO THE INVENTION

This invention relates to processes for treating articles, e.g. by coating where it is desired to produce a large number of treated articles which fall within certain limits of quality or dimension.

SUMMARY OF THE INVENTION

According to the invention there is provided a process for treating untreated articles followed by a grading operation to grade the articles according to their treated condition, the process comprising at least two similar stages to which the articles are subjected in succession and characterized in that undertreated articles detected by the grading operation are passed back for further treatment in the second stage and overtreated articles are first reduced to substantially the untreated condition and then recycled through both treatment stages.

In the application of overcoatings of carbon on to coated nuclear fuel particles or microspheres for example it can be advantageous to have, substantially, all the particles at the end of the process within a given range of diameters so that a regular distribution of nuclear fuel particles occurs throughout any mass of such particles. The same considerations may apply to coated particles of catalyst materials and to other coated articles.

In this context a method of producing coatings on to particles to yield a high proportion of particles within a narrow range of outer diameter dimensions resides in treating the untreated particles to apply an initial coating on a batch system in a first stage, feeding all the product particles of the first stage to a second stage in which the coating process is continued, grading the product particles of the second stage for size, passing the required size fraction to acceptance, returning those below the required size fraction for further coating in the second stage and returning those particles above the required size fraction to the first stage of the process having first restored this oversized fraction to the said untreated condition.

DESCRIPTION OF THE DRAWINGS

In order that the invention may be more fully understood one process embodying the invention will now be described with reference to the accompanying diagrammatic drawings.

In the drawings.

DESCRIPTION OF THE PREFERRED EMBODIMENT

Figure 1:
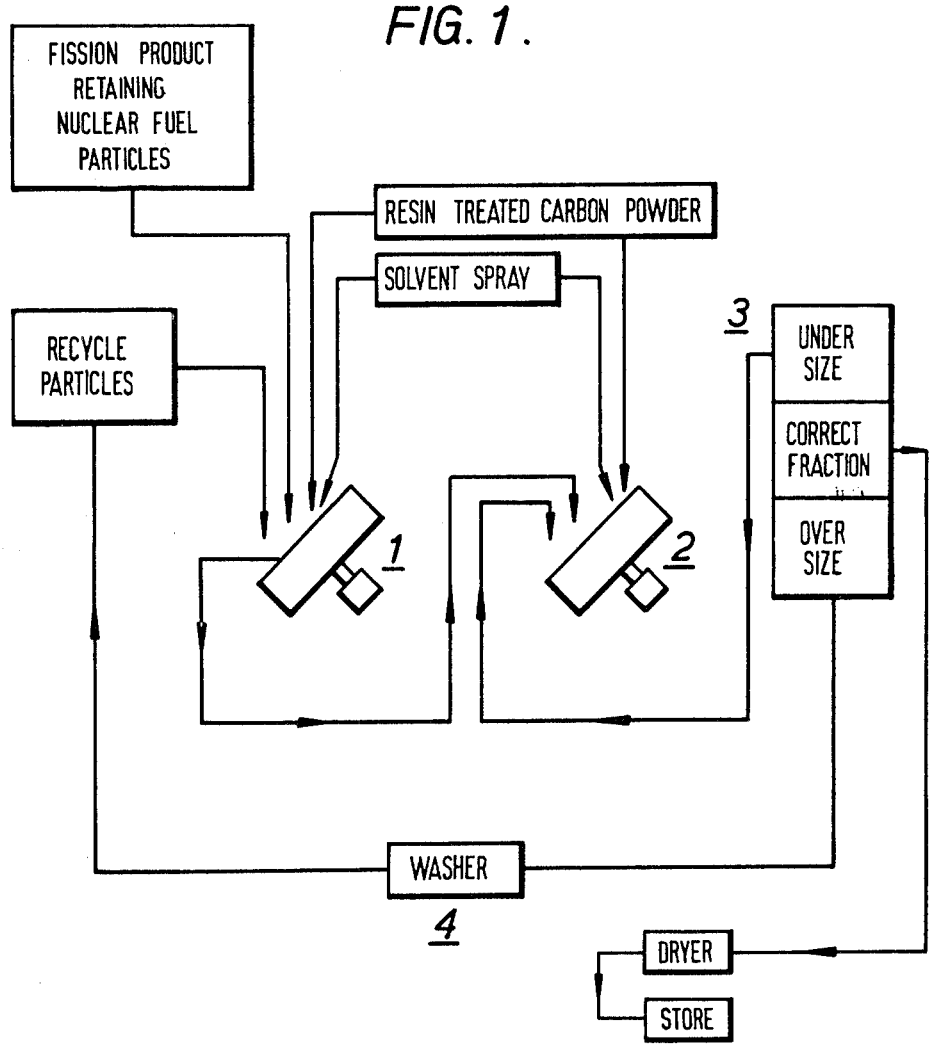
FIG. 1 shows the process in a block schematic diagram.

In FIG. 1 the process in outline is to supply untreated particles into a rotating drum 1 in which at a first stage, an initial coating of graphite powder is applied to the particles by tumbling them while coating material is introduced into the drum. When the coating process is only partially completed, the particles are transferred to a second drum 2 where in a second stage the coating process is continued to completion. Oversized product particles from the second stage are returned to the first stage drum 1 via a washer 4 which restores the particles to their untreated state so that the feed for the drum 1 are all uncoated (so far as this process is concerned) particles. Undersized product particles from the second stage are returned to the second stage drum 2 for the application of further coating material.

Describing the process in a little more detail (FIG. 2) a batch of nuclear fuel particles which have previously received a coating of a fission product retaining layer by a previous operation, e.g. in a fluidised bed coater are selected for size and quality and used as a feed in a first stage. The particles are placed in an open ended drum 1 along with recycle particles derived as explained below, and the drum which is mounted with its axis at 30° to the horizontal is rotated on its axis. While rotation is continued, the particles are tumbled with graphite powder, the grains of which have been coated with phenol formaldehyde resin. The graphite powder is caused to fall by gravity into the drum from a vibratory feeder. Every few minutes a spray of methylated spirits, a solvent for the resin is directed into the drum. This tends to soften the resin and cause the powder to adhere to the tumbling particles. This process stage is continued and the particles become coated with a soft carbon layer or overcoat. When sufficient carbon powder has been fed in to give an overcoat of a thickness somewhat less than that which is finally required, the drum 1 is stopped and the particles removed and transferred to a similar drum 2 for the second stage of the process. In to the drum 2 is also fed undersized product particles from this second stage derived as described below. The drum 2 is rotated in like manner to the drum 1 and, also in like manner, resin coated graphite powder grains are gravity fed into the drum. The powder is made to adhere to the tumbling particles by spraying methylated spirit at intervals into the drum as before. It is important to ensure that during the short periods when the solvent is being sprayed into the drums 1 and 2, the supply of graphite powder is stopped.

The product particles from the drum 2 are passed to a grading process in which the required size fraction is separated from the remainder and the required fraction is passed into a dryer, to dry off the solvent, and then to a storage bin. The undersized fraction is returned directly to the drum 2 as feed with the partially coated particles. The oversized fraction is passed to a washer 4 where the coatings applied in both drums 2 and 1 are washed off, as by tumbling the particles in resin solvent. These particles emerge from the washer in a virtually untreated condition and, devoid of any overcoating, they are recycled to join the feed stock for drum 1 which they resemble.

Because the feed particles to the respective drums have like coatings on them the process lends itself to automatic transfer of particles between stages with an intermittent withdrawal of overcoated particles from the drums 1 and 2 which rotate practically continually. Alternatively, it could work on a batch principle.

Figure 2:
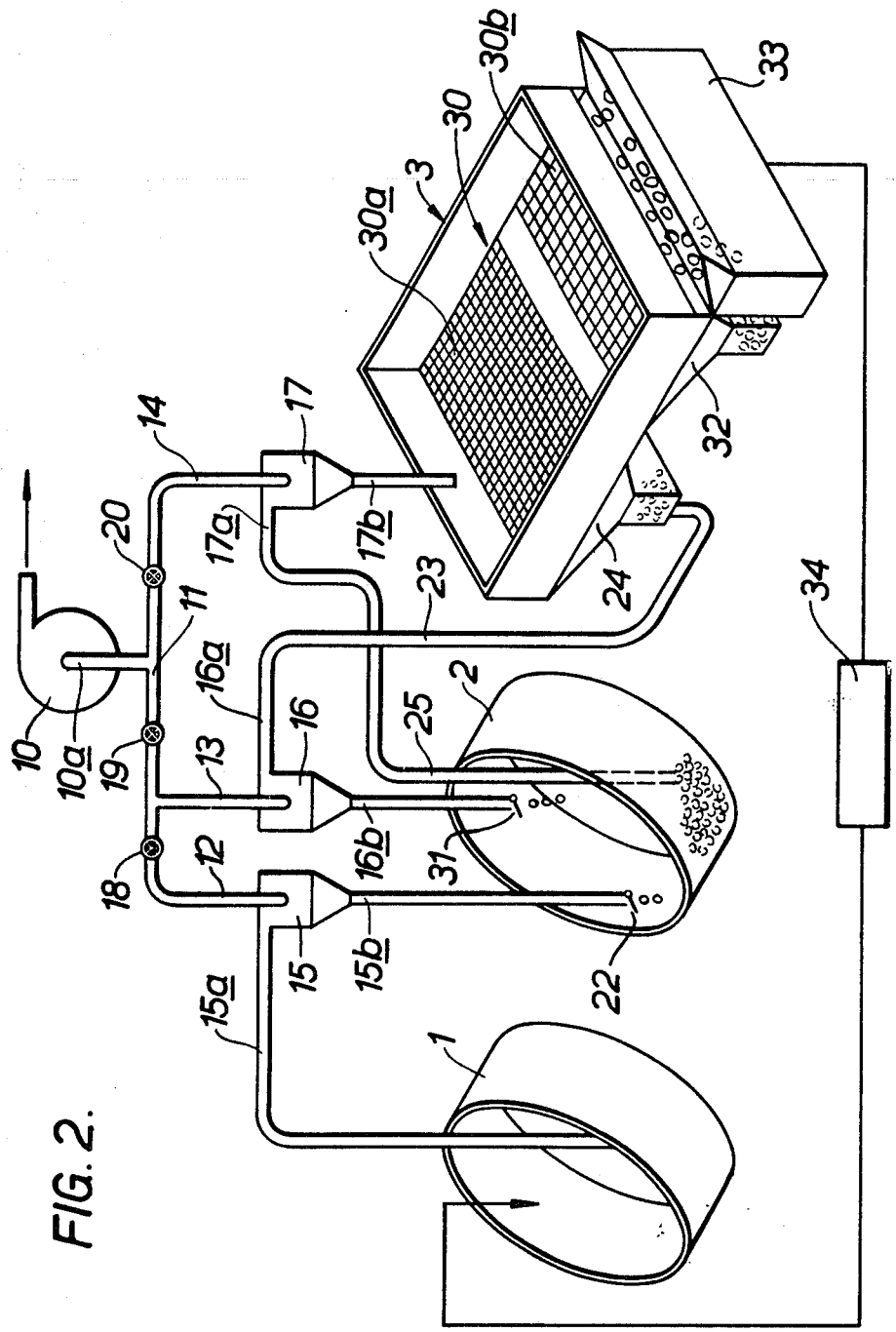
FIG. 2 shows a pictorial view of the process shown in FIG. 1 and the grading process.

In FIG. 2, in which similar parts bear the same reference numerals as in FIG. 1, particles partially coated in drum 1 are transferred to drum 2 and particles from drum 2 are transferred to the grader 3 by a pneumatic system shown. The pneumatic tansfer system is powered by a blower 10 whose suction side 10a is connected to a line 11 which has three vertical outlets 12, 13 and 14 in the form of pipes which enter axially the respective cyclone chambers 15, 16, 17. The line 11 has valves 18, 19, 20 arranged so that the outlet 14 or the outlet 13 or both outlets 13 and 12 can be connected to the suction side 10a of the blower. The cyclone chambers 15, 16, 17 have tangental, horizontal inlet pipes 15a, 16a and 17a connected to receive particles and vertically dependent outlets 15b, 16b, 17b connected to deliver the particles received.

The cyclone chamber 15 has its inlet 15a connected to a pipe 21 which dips into the drum 1 whilst its outlet 15b depends vertically into the open end of drum 2. The end of the outlet 15b has a flap valve 22 which is normally held closed by a weak spring. The bias of the spring is easily overcome by a mass of particles contained within the outlet 15b in spite of any depression therein.

The cycline chamber 16 has its inlet pipe 16a connected to a pipe 23 which communicates with a hopper 24 containing the undersized fraction from the grader 3. The outlet 16b depends into the mouth of the drum 2.

The cyclone chamber 17 has its inlet 17a connected to a pipe 25 which dips into the drum 2 and its outlet 17b arranged to deliver particles into the grader 3. The grader 3 comprises an inclined screen 30 of two different size of mesh 30a, 30b to pass respectively the particles which are undersize and the correct particle diameter. As shown the undersize particles fall into the hopper 24. When required these particles may be withdrawn from the hopper 24 and transferred to the drum 2 by opening valve 19 and sucking the particles into the cyclone chamber 16 where they fall by gravity out the outlet 16b forcing open the flap valve 31 (similar to flap valve 22) to fall into the underlying drum 2. The correctly sized particles pass through a lower part 30b of the screen where the mesh is larger and fall into a hopper 32 whilst the oversized particles roll across the face of the screen and fall into collector 33. These last particles are transferred at intervals to a washer where they are tumbled in solvent until the overcoat is washed off them and they are restored to the untreated condition. They are then placed in the drum 1 along with the fresh feed particles.

This combined feed stock for drum 1 is tumbled in the drum whilst resin coated graphite grains are introduced into the drum in proportions such that with the addition of resin solvent the particles acquire an overcoat of somewhat less than the required thickness. Then rotation of the drum is stopped and valves 18 and 19 are open. The partially overcoated particles are drawn up through pipe 21 into the cyclone chamber 15 and drop by gravity into the outlet 15b. When a given weight of particles are present in the outlet the flap valve 22 opens and the particles fall into the drum 2. The undersized particles from hopper 24 are drawn through pipe 23 and passed into drum 2 via cyclone chamber 16.

The second stage of the coating then takes place in drum 2 with the valves 18, 19 closed and when a sufficient coating layer has been applied, valve 20 is opened to suck the particles into the cyclone chamber 17 when they drop through outlet 17b onto the grader 3. In the grader the correctly sized particles fall into hopper 32 and are passed to a drying oven and storage, the undersized particles are passed into hopper 24 for recycle into drum 2 whilst the oversized particles pass into hopper 33 for washing and recycling to drum 1.

Although described here in connection with the graphite overcoating of fission product retaining fuel, the invention is equally applicable to coating other particles or small spheres with appropriate material so long as the item having an excessive coating can be restored to its untreated state. For example metal coated nuclear fuel particles for cermet fuel manufacture may be treated.

We claim:

1. A process for applying an outer coating to nuclear fuel particles to provide a high yield of particles of external dimensions which fall within a narrow range, the process comprising firstly applying to a batch of uncoated particles, an initial coating less than that required to produce a coated particle of the required size in a first stage, feeding all the particles so coated to a second stage in which additional coating is applied to the coated particles, subjecting coated particles from the second stage to a size grading operation to remove the coated particles of required size from undersized and oversized coated particles, passing the undersized coated particles back for additional coating in the second stage, removing the coating from oversized coated particles and recycling the uncoated particles through the first stage, the second stage and the grading operation.

2. Process as claimed in claim 1 wherein the nuclear fuel particles are microspheres and the coating applied in said first and second stages is a powder coating.

3. A process as claimed in claim 2 in which the coating stages are carried out by tumbling the microspheres in a first stage with powdered coating material so that the particles acquire an initial coating, subjecting the particles to a second tumbling operation, grading the particles, cleaning off the coating applied in both stages from those particles which are oversize and returning them to the first stage, returning the undersize particles to the second coating stage.

4. A process as claimed in claim 3 which includes fluidizing the particles in a moving stream of gas to effect their transfer between stages.

References Cited

UNITED STATES PATENTS

| | | | |
|---|---|---|---|
| 3,220,875 | 11/1965 | Queneau | 117—109 X |
| 3,387,985 | 6/1968 | Huber | 117—109 X |
| 3,344,211 | 9/1967 | Redding et al. | 117—109 X |
| 2,324,874 | 7/1943 | Peters | 118—303 X |
| 2,860,598 | 11/1958 | Loesche | 117—100 X |
| 3,079,316 | 2/1963 | Johnson | 176—91 X |
| 3,313,613 | 4/1967 | Green | 117—100 X |
| 3,317,307 | 5/1967 | Wise et al. | 117—100 X |
| 3,492,379 | 1/1970 | Redding | 176—91 |
| 3,260,611 | 7/1966 | Weidenhammer et al. | 117—100 |

OTHER REFERENCES

Natalis: "Process For Spraying Mica Spacers," RCA Technical Notes, RCA TNN.444, January 1961.

WILLIAM D. MARTIN, Primary Examiner

M. R. P. PERRUNE, Jr., Assistant Examiner

U.S. Cl. X.R.

117—24, 27, 100 B, 100 M, 102 R, 102 A, 109; 118—303; 176—91 R